No. 629,428. Patented July 25, 1899.
W. M. COOK.
ROTARY HARROW AND CLOD CRUSHER.
(Application filed Apr. 20, 1898.)

(No Model.) 2 Sheets—Sheet 1.

Witnesses
T. W. Riley
Chas. B. Brock

Inventor
William M. Cook,
by O'Mara & Co.
Attorneys

THE NORRIS PETERS CO., PHOTO-LITHO., WASHINGTON, D. C.

No. 629,428. Patented July 25, 1899.
W. M. COOK.
ROTARY HARROW AND CLOD CRUSHER.
(Application filed Apr. 20, 1898.)
(No Model.) 2 Sheets—Sheet 2.
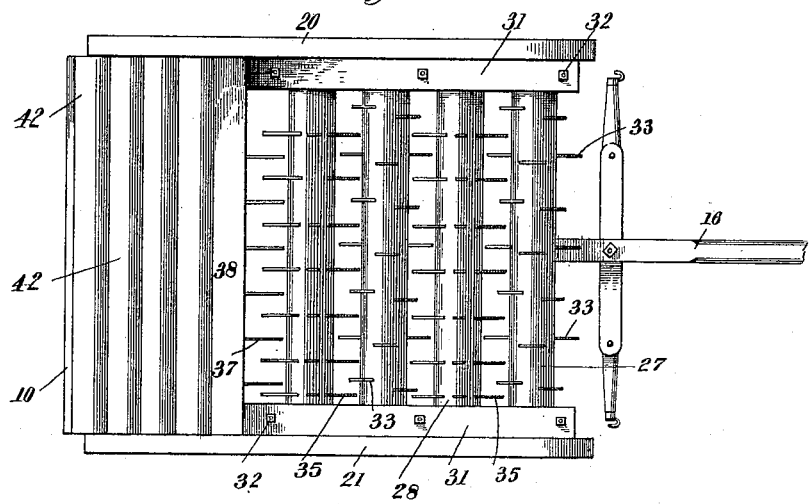
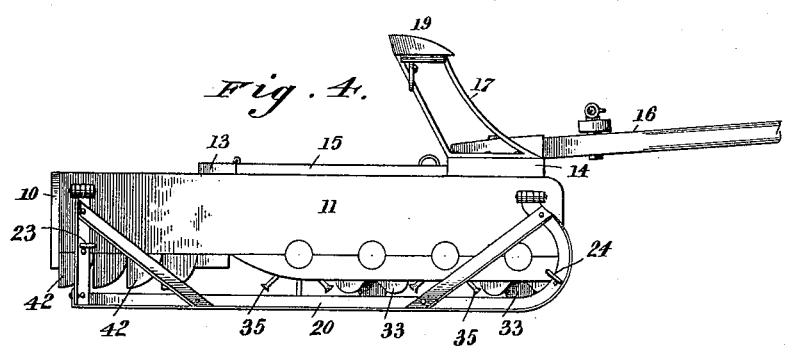
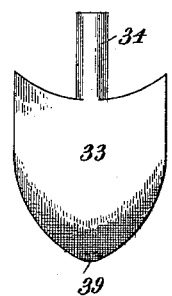
Witnesses
Inventor
William M. Cook,
Attorneys

UNITED STATES PATENT OFFICE.

WILLIAM M. COOK, OF WARREN, OHIO.

ROTARY HARROW AND CLOD-CRUSHER.

SPECIFICATION forming part of Letters Patent No. 629,428, dated July 25, 1899.

Application filed April 20, 1898. Serial No. 678,296. (No model.)

*To all whom it may concern:*

Be it known that I, WILLIAM M. COOK, a citizen of the United States, residing at Warren, in the county of Turnbull and State of Ohio, have invented a new and useful Rotary Harrow and Clod-Crusher, of which the following is a specification.

My invention relates to harrows, and has for its object the provision for the use of farmers of a single implement in which shall be combined the functions of a harrow, a clod-crusher, and a leveler, the improved construction being such that the combined implement can be operated by a single person and team with the same ease and speed of either implement singly, thus greatly economizing time and power.

With this object in view my invention consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation, reference being had to the accompanying drawings, forming part of this specification, in which—

Figure 1:
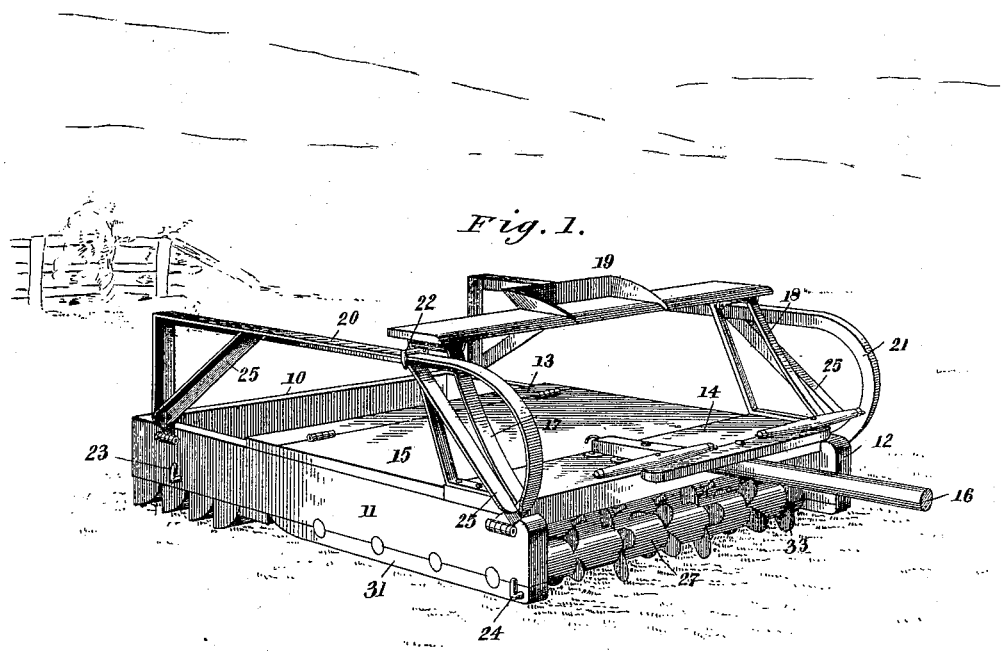
Figure 2:
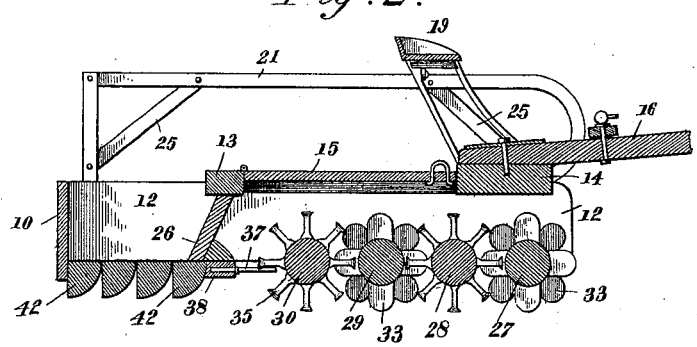
Figure 8:
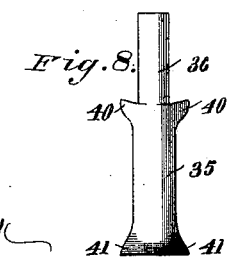
Figure 7:

Figure 1 is a perspective view of a rotary harrow and clod-crusher constructed in accordance with my invention. Fig. 2 is a longitudinal vertical sectional view on the line 2 2 of Fig. 3. Fig. 3 is a bottom plan view. Fig. 4 is a view in side elevation with the runners adjusted to drag the implement from place to place. Fig. 5 is a side view of one of the teeth of the first and third rolls. Fig. 6 is an edge view of the same. Fig. 7 is a side view of one of the teeth of the second and fourth rolls. Fig. 8 is an edge view of the same.

Like numerals of reference indicate the same parts wherever they occur in the different figures of the drawings.

Referring to the drawings by numerals, 10 indicates the rear and 11 and 12 the side pieces of the rectangular frame of my harrow, the front being open and the sides connected by cross-bars 13 and 14, secured on their upper edges, the intermediate space between these cross-bars being occupied by a door or trap 15, hinged to the rear cross-bar 13. To the front cross-bar 14 are secured the tongue or pole 16 and the supports 17 and 18 of the seat 19.

In order to provide means for hauling the apparatus from place to place without the working parts contacting with the ground, I have hinged a pair of runners 20 and 21 to the outside of the side pieces 11 and 12 of the frame, and to hold these runners in their raised or inoperative positions hooks 22 at the opposite ends of the seat-frame are adapted to catch over them, as shown in Fig. 1, while hooks 23 and 24, projecting from the sides of the frame, serve to hold them in the lowered or operative position, in which they support the frame high enough to raise the teeth clear of the earth, such operative position being illustrated in Figs. 3 and 4. The runners are constructed of angle-iron and are provided with suitable braces 25. A board 26, slightly inclined backward from the perpendicular, extends from the one side piece to the other, its upper edge being against the under side of cross-bar 13 and its lower edge even with the bottom of the side pieces 11 and 12.

27, 28, 29, and 30 indicate four cylinders or rollers trunnioned in bearings formed partially in the side pieces 11 and 12 of the frame and partially in bearing-strips 31, secured upon the bottom of said strips by means of bolts 32. The cylinders 28 and 30 are provided with teeth 35, projecting radially therefrom, of the shape illustrated in Figs. 7 and 8, they being also secured in the cylinder by inserting their stems 36 in like radial recesses. The teeth on each of these cylinders alternate with and overlap the teeth of the adjacent cylinders, and the teeth of cylinder 30 overlap and alternate with pins or teeth 37, projecting forward from the cross-beam 38, whose upper surface is inclined forward from the under side of the board 26, so that any dirt which may be thrown upward by the teeth 35 of cylinder 30 will slide off this inclined surface and not be lodged within the apparatus. The teeth 33 of the cylinders 27 and 29 are somewhat broader than the teeth 35 of the cylinders 28 and 30, being substantially of the shape of a shield, their upper inward-curved ends fitting against the peripheries of the cylinders and their front and rear edges and bottom being beveled off, the bottom ending in a sharp point, as at 39. The teeth 35 consist of a main body somewhat flattened and slightly wider than the stem 36, provided with forward and rear projections 40 and 41, beveled off to the front and rear and finished to an edge at the bottom, the upper projections 40 being curved on their upper faces to fit the peripheries of the cylinders and the lower projections, together with the main body of the tooth, being sharpened to a chisel edge at the extreme lower edge. Cross-beams 42, shaped in section like a ninety-degree segment of a circle, are secured upon the bottom of the sides 11 and 12 in the rear of the toothed cylinders, with their curved sides forward and downward, as clearly shown.

The construction of my invention will be readily understood from the foregoing description, and its operation may be described as follows: With the parts in the positions shown in Figs. 3 and 4 a team may be hitched to the pole or tongue in the usual manner and the apparatus or implement dragged on the runners 20 and 21, as a sled, to any part of the field or farm on which it may be necessary to use it. Having arrived at the field it is desired to operate on, the hooks 23 and 24 are disengaged from the runners 20 and 21, the runners reversed in position or raised, as shown in Figs. 1 and 2, and the hooks 22 engaged over them to prevent their falling. The team is now started, with the teeth of the cylinders and the cross-bars 42 in contact with the earth. The teeth of the cylinders will sink into the earth and effectually break and pulverize the lumps therein, the smallest of the lumps being crushed by the passage of the cross-bars 42 over them, said cross-bars serving to smooth the ground passed over. It will thus be seen that by passing my improved harrow and clod-crusher over the ground at once the clods and lumps therein will be thoroughly pulverized and the ground smoothed, thereby dispensing with the use of more than one implement for this purpose, as is very often necessary.

While I have illustrated and described what I now consider efficient means for carrying out my invention, I do not wish to be understood as limiting myself to the exact details of construction shown and described, but hold that such slight changes or variations as might suggest themselves to the ordinary mechanic would properly fall within the limit and scope of my invention.

Having thus fully described my invention, what I claim as new, and desire to secure by Letters Patent of the United States, is—

The combination with the frame of the harrow, of the cylinders 27, 28, 29 and 30 mounted in bearings between the frame and the bearing-strip 31, the cylinders 27 and 29 being provided with shield-shaped teeth 33, and the cylinders 28 and 30 with the teeth 35, having the beveled-off upper and lower front and rear projections 40 and 41, the latter and the body of the tooth being formed with a chisel edge at the bottom, substantially as described.

WILLIAM M. COOK.

Witnesses:
ARTHUR HATELEY,
JOHN FROMENT.